United States Patent
Natanzon et al.

(10) Patent No.: US 10,146,639 B1
(45) Date of Patent: Dec. 4, 2018

(54) RECOVERY OF VIRTUAL MACHINES FROM A PROTECTION TIER

(71) Applicant: EMC Corporation, Hopkinton, MA (US)

(72) Inventors: Assaf Natanzon, Tel Aviv (IL); Kalyan C Gunda, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 206 days.

(21) Appl. No.: 15/201,179

(22) Filed: Jul. 1, 2016

(51) Int. Cl.
| | |
|---|---|
| *G06F 11/00* | (2006.01) |
| *G06F 11/14* | (2006.01) |
| *H04L 29/08* | (2006.01) |
| *G06F 9/455* | (2018.01) |
| *G06F 11/07* | (2006.01) |

(52) U.S. Cl.
CPC ...... *G06F 11/1469* (2013.01); *G06F 9/45533* (2013.01); *G06F 11/0712* (2013.01); *H04L 67/1097* (2013.01); *G06F 2201/805* (2013.01)

(58) Field of Classification Search
CPC ............. G06F 11/1469; G06F 11/0712; G06F 11/1402; G06F 11/2023; G06F 11/2041; G06F 2201/805; G06F 9/45533; H04L 67/1097
See application file for complete search history.

(56) References Cited

U.S. PATENT DOCUMENTS

| | | | | |
|---|---|---|---|---|
| 9,128,627 | B1 * | 9/2015 | Bachu ................ | G06F 11/1456 |
| 2013/0263122 | A1 * | 10/2013 | Levijarvi ............ | G06F 11/1415 |
| | | | | 718/1 |
| 2014/0095816 | A1 * | 4/2014 | Hsu ........................ | G06F 3/0655 |
| | | | | 711/162 |
| 2014/0149696 | A1 * | 5/2014 | Frenkel ................... | G06F 12/16 |
| | | | | 711/162 |
| 2015/0052524 | A1 * | 2/2015 | Raghu ..................... | G06F 9/455 |
| | | | | 718/1 |
| 2016/0085575 | A1 * | 3/2016 | Dornemann ........ | G06F 11/1471 |
| | | | | 718/1 |
| 2016/0142485 | A1 * | 5/2016 | Mitkar ................ | H04L 67/1097 |
| | | | | 707/681 |

* cited by examiner

*Primary Examiner* — Joseph D Manoskey
(74) *Attorney, Agent, or Firm* — Dergosits & Noah LLP; Todd A. Noah

(57) ABSTRACT

Disclosed are systems and methods for recovering a virtual machine (VM) using cloud computing services. Backed up data associated with a first virtual machine (VM) is stored in a cloud-based storage associated with a cloud computing service. A first instance of a recovery VM service is activated and configured to execute using the cloud computing service. Metadata associated with the first VM is sent to the first instance of the recovery VM service from a primary site based on receiving a certificate authorization. A notification from the first instance of the recovery VM service is received to notify that the recovery of the first VM is completed. The first VM is configured to execute using the cloud computing service.

20 Claims, 10 Drawing Sheets

RECOVERY OF VIRTUAL MACHINES FROM A PROTECTION TIER

BACKGROUND

The present invention relates to the field of information technology, including, more particularly, to systems and techniques for data recovery.

Computer systems are constantly improving in terms of speed, reliability, and processing capability. As known in the art, computer systems that process and store large amounts of data typically include a one or more processors in communication with a shared data storage system in which the data may be stored. The data storage system may include one or more storage devices, usually of a fairly robust nature and useful for storage spanning various temporal requirements, e.g., disk drives. One or more processors may perform respective operations using a storage system. Mass storage systems (MSS) may typically include an array of a plurality of disks with on-board intelligent and communications electronics and software for making data on the disks available.

Companies that sell data storage systems and the like may be extremely concerned with providing customers with an efficient data storage solution that minimizes cost while meeting customer data storage needs. The data storage solution may include solution to backup and recover data. It would be beneficial for such companies to have a way for reducing the complexity of implementing data storage.

DETAILED DESCRIPTION

For some embodiments, systems and methods for recovering a virtual machine (VM) using cloud computing services are disclosed. Backed up data associated with a virtual machine (VM) is stored in a cloud-based storage associated with a cloud computing service. A recovery VM service is activated in the cloud computing service based on receiving a request to recover the VM. Certificate authorization associated with the VM may be used by a backup and recovery system to verify that the recovery VM service is authorized to recover the VM. Metadata associated with the VM may be sent from the backup and recovery system to the recovery VM service and used by the recovery VM service to recover the VM. A notification is received from the recovery VM service that the VM is recovered. Multiple instances of the recovery VM service may operate in parallel to recover multiple VMs.

Traditionally, cloud storage providers (CSPs) such as, for example, Amazon, Inc. of Bellevue, Wash., provide data storage services (referred to herein as cloud-based storage) to consumers of data storage, such as users and/or applications. Typically, one such service is using object based storage. Generally, object based storage is a cost effective method of providing data storage services from a CSP. Object based storage scales linearly as more data storage nodes are added to a CSP's data centers. Conventionally, CSPs provide narrow interfaces into their object based data storage systems. One example of such storage service offered by Amazon, Inc. is Simple Storage Service (or S3). Object-based storage (OBS) refers to data repositories where blobs of data are placed. Conventionally, these blobs of data are called objects. OBS is a cost effective method of storing data as objects. The objects can be anywhere from a few bytes to data to several megabytes of data. The objects may be referenced to by pointers. As will be described, embodiments of the present invention make a hash value based on an object may be used as a pointer to reference that object in the OBS.

Cloud computing services may also be used by developers to develop web-based applications. One example of such cloud computing service is Elastic Compute Cloud (or EC2) offered by Amazon, Inc. Cloud computing service reduces the time required to obtain and boot new server instances, allowing the developers to quickly scale capacity, both up and down, as their computing requirements change. As will be described, embodiments of the present invention make use of the cloud computing services to recover virtual machines (VM).

Figure 1:
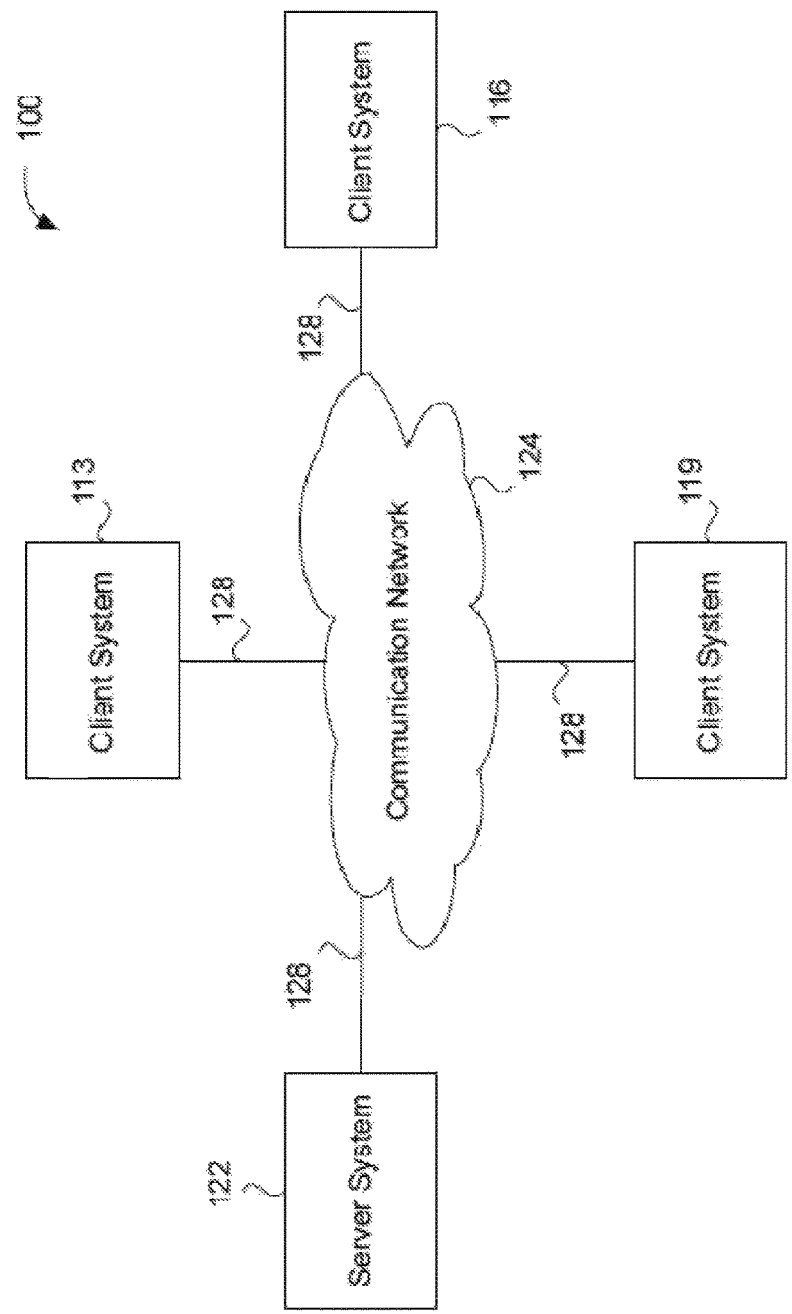
FIG. 1 shows a block diagram of a client-server system and network, implemented in accordance with an exemplary embodiment.

Prior to describing the subject matter in detail, an exemplary computer network in which the subject matter may be implemented shall first be described. Those of ordinary skill in the art will appreciate that the elements illustrated in FIG. 1 may vary depending on the system implementation. With reference to FIG. 1, FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
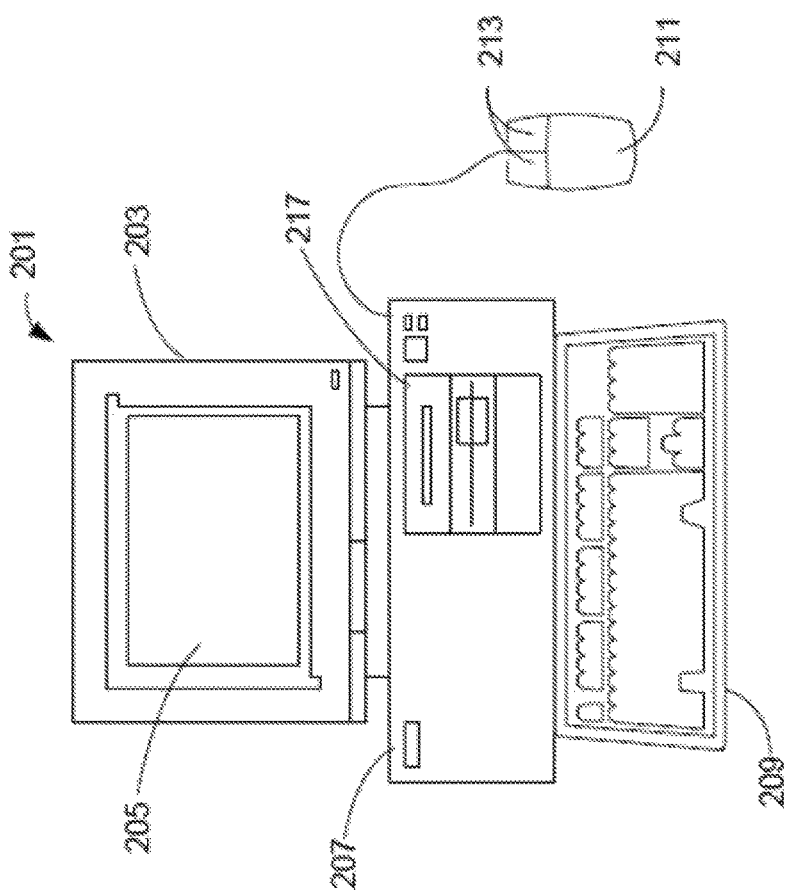
FIG. 2 shows a more detailed diagram of an exemplary client or computer, implemented in accordance with an exemplary embodiment.

FIG. 2 shows an exemplary client or server system. In an embodiment, a user interfaces with the system through a computer workstation system, such as shown in FIG. 2. While FIG. 2 illustrates a computer workstation, the user can interface with the system through a mobile device such as a mobile phone, laptop computer or computer tablet. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of various implementations may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of software may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
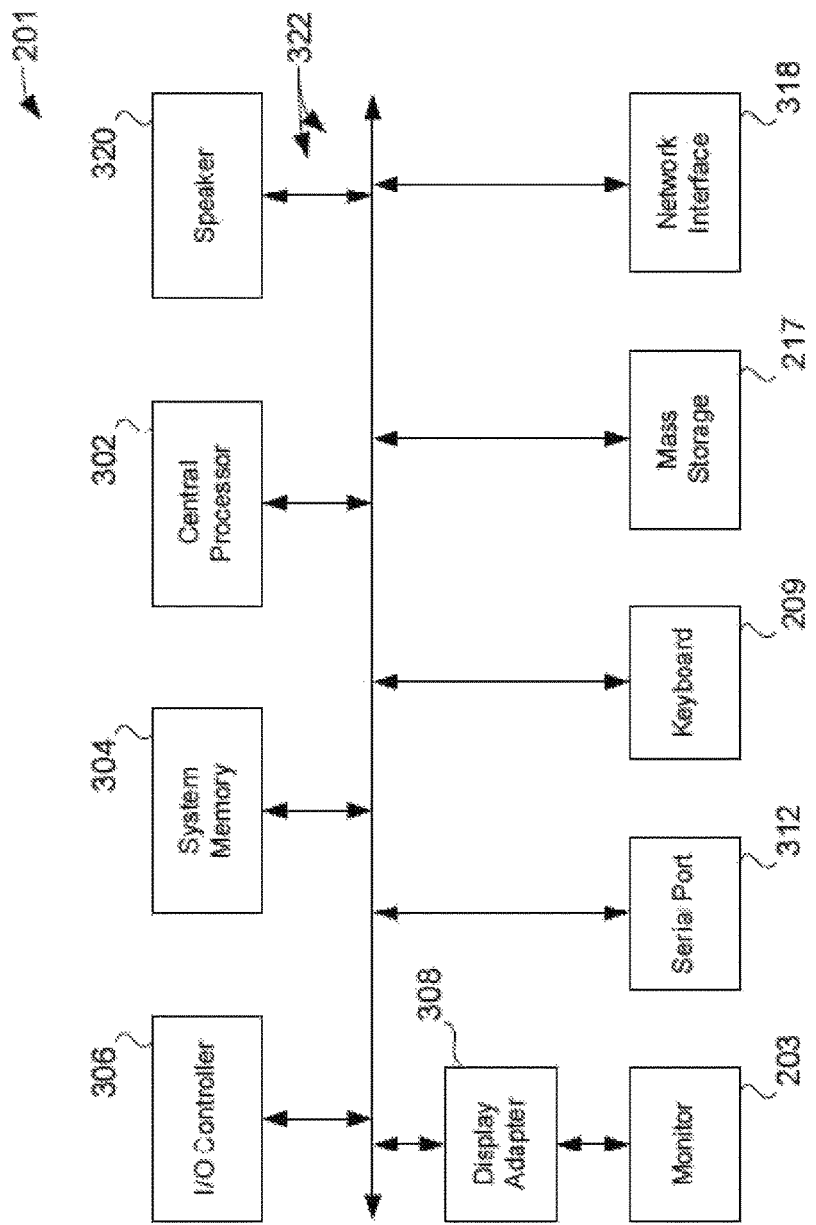
FIG. 3 shows a system block diagram of a client computer system, implemented in accordance with an exemplary embodiment.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
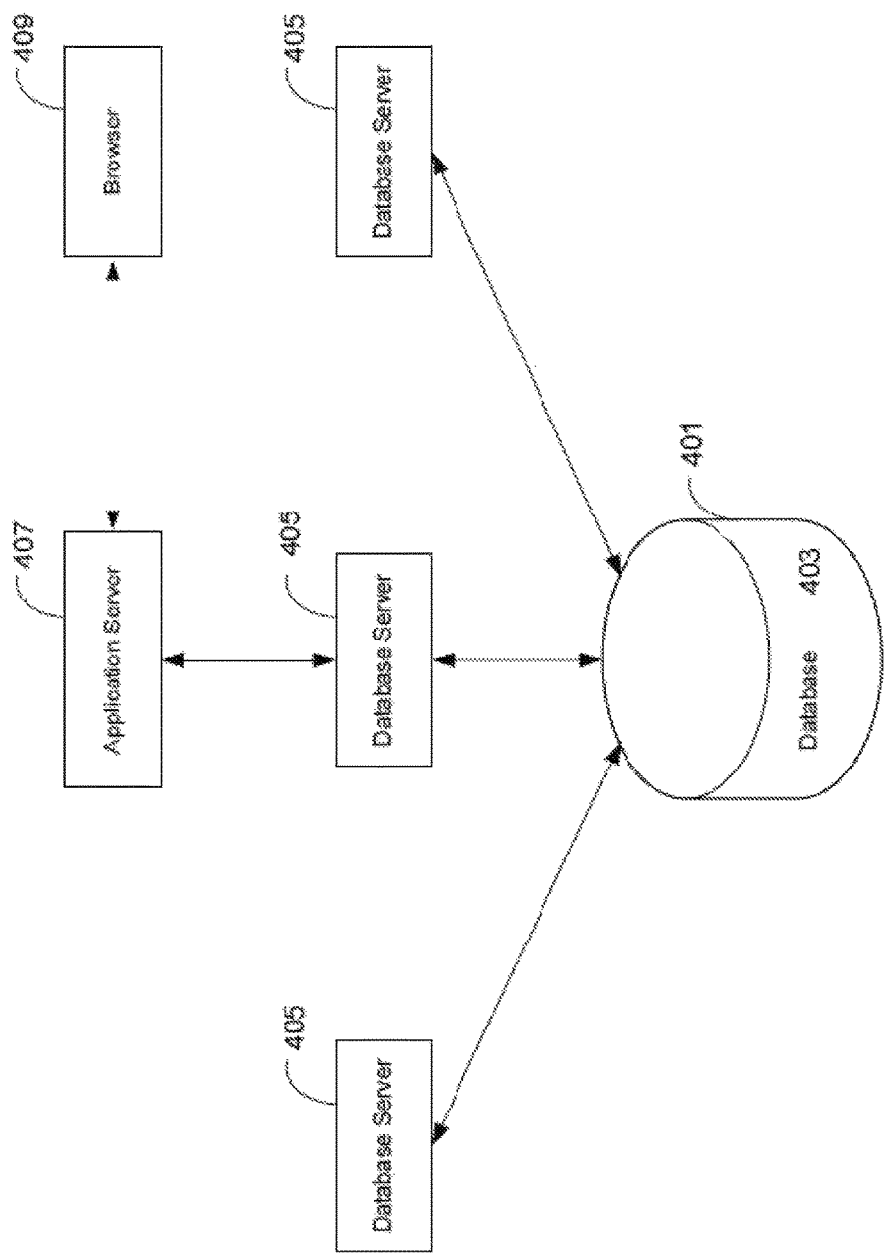
FIG. 4 shows a data source or data service in the form of a database system, implemented in accordance with an exemplary embodiment.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 5:
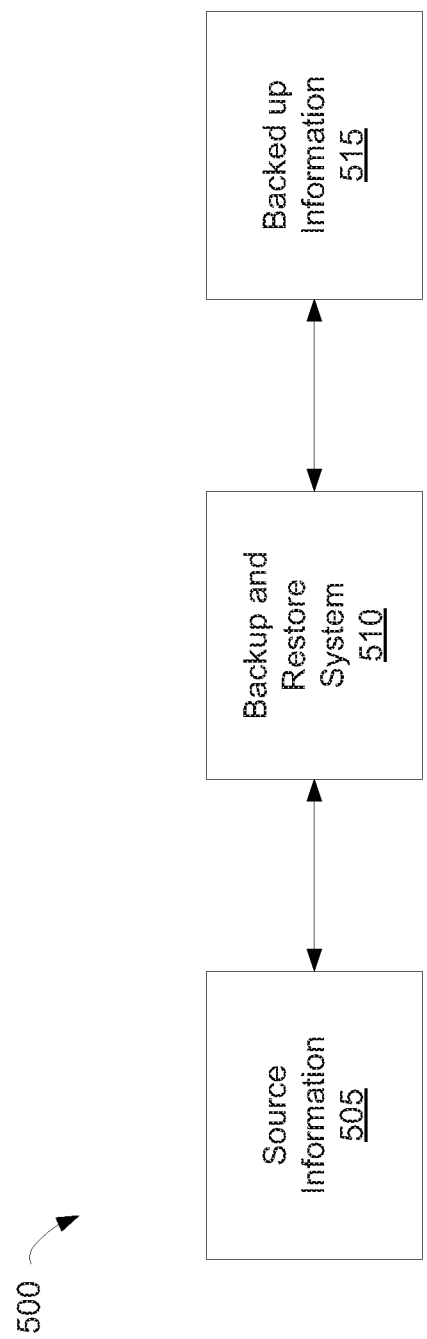
FIG. 5 shows an example backup and recovery system, in accordance with some embodiments.

FIG. 5 shows an example backup and recovery system, in accordance with some embodiments. Diagram 500 shows an overview of a backup and recovery system 510 configured to perform backup operations to backup source information 505 and store it as backed up information 515. During a backup operation, the source information is copied to a backup storage device which may be a disk storage. It is possible that most of the source information 505 remains the same between two consecutive backups. For some embodiments, the backup and recovery system 510 may perform de-duplication operations so that information that remains the same may not be backed up or replicated. Tiering may be performed between two levels of storage devices. For example, a deduplicated storage array (e.g., EMC® XtremIO® by EMC Corporation of Hopkinton, Mass.) may be used to do tiering between two levels of storage devices.

Figure 6:
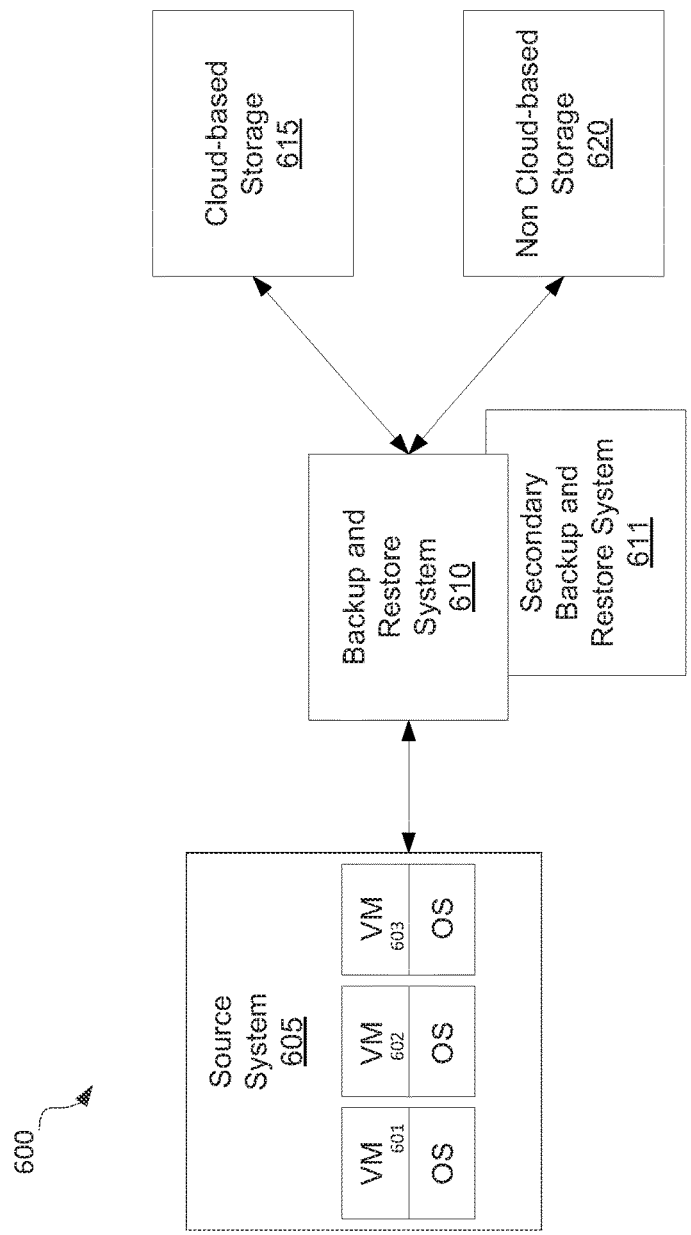
FIG. 6 shows another example backup and recovery system using cloud storage, in accordance with some embodiments.

FIG. 6 shows another example backup and recovery system using cloud-based storage, in accordance with some embodiments. The cloud-based storage may be a service provided by cloud storage providers (CSPs) such as, for example, Amazon S3. As shown in diagram 600, the backup and recovery system 610 may be configured to backup information associated with a source system 605 and store the backed up information using multiple tiers. The multiple tiers may be associated with the cloud-based storage 615 and the non-cloud-based storage 620. The tier associated with the cloud-based storage 615 may be referred to as a protection tier. Using the cloud-based storage 615 may extend the amount of data stored in the non-cloud-based storage 620 significantly while reducing the cost. One disadvantage of using the cloud-based storage 615 is that access to the data may be slower, due to high latency.

For some embodiments, the source system 605 may include multiple virtual machines (VM) including, for example, VMs 601-603. Each of the VMs 601-603 may be associated with an operating system (OS). Each of the VMs 601-603 may be represented as one or more disks. Each disk may be processed as a disk file. For some embodiments, the backup and recovery system 610 may back up the disk files associated with the VMs 601-603 to one or more of the cloud-based storage 615 and non-cloud-based storage 620. Other VM related information (e.g., metadata, configuration file) associated with each of the VMs 601-603 may also be backed up.

For some embodiments, the metadata and configuration files may be stored only in the non-cloud-based storage 620. For some embodiments, the metadata and configuration files may be stored in both the cloud-based storage 615 and the non-cloud-based-storage 620. Storing the metadata and the configuration files in the cloud-based storage 615 may enable recovery of the VMs in situations when accessing the non-cloud-based storage 620 is not possible.

For some embodiments, the backup and recovery system 610 may be configured to operate locally as an on-premise system. For some embodiments, a secondary backup and recovery system 611 may be configured to perform the backup and recovery operations when the backup and recovery system 610 (as a primary system) is unable to perform such operations (e.g., due to a disaster). For some embodiments, the secondary backup and recovery system 611 may be located at a different site from the backup and recovery system 610.

Figure 7:
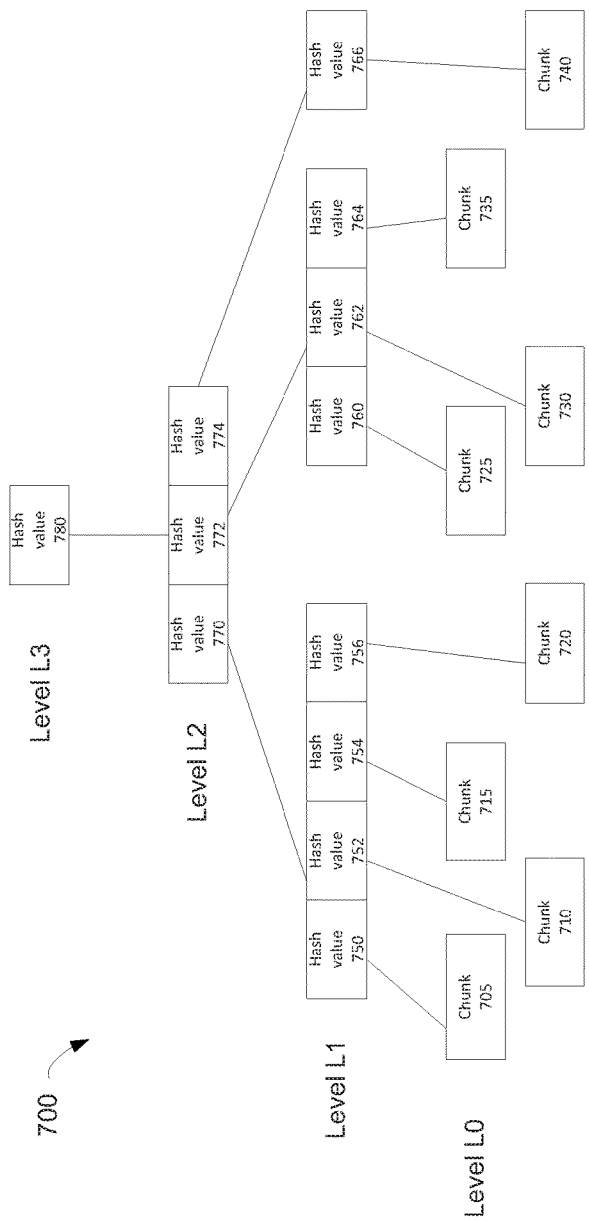
FIG. 7 shows an example of using hash values to describe objects, in accordance with some embodiments.
Figure 8:
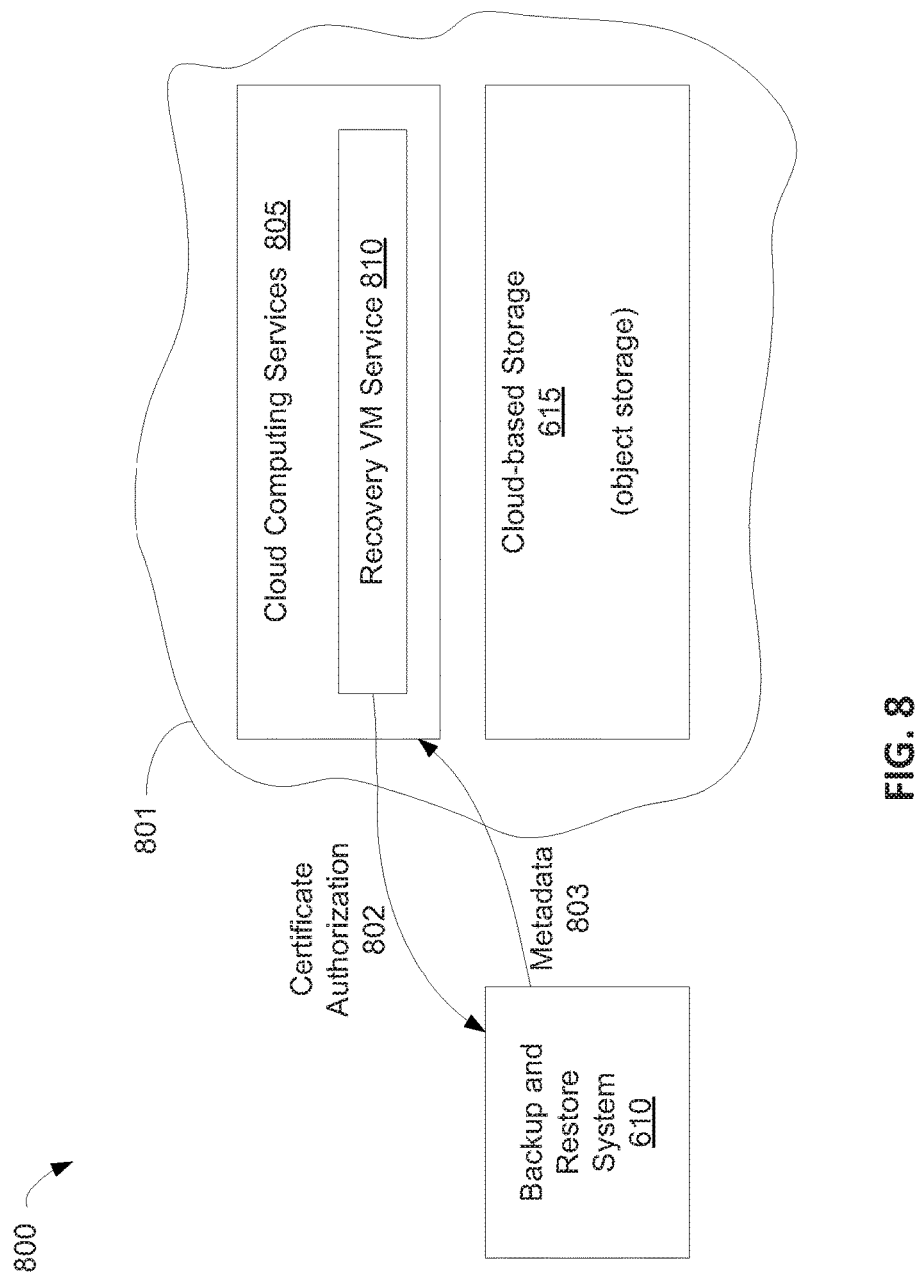
FIG. 8 shows an example of using cloud computing services for recovering VMs, in accordance with some embodiments.

FIG. 7 shows an example of using hash values and objects to backup the disk files associated with a VM, in accordance with some embodiments. In general, the OBS is a storage architecture that manages data as objects, as opposed to other storage architectures like file systems which manage data as a file hierarchy and block storage which manages data as blocks within sectors and tracks. Each object typically includes the data itself, a variable amount of metadata, and a globally unique identifier. The OBS is shown in FIG. 8 as part of a cloud-based storage 615. An object in the OBS may be described by a single hash value as the identifier. For some embodiments, the disk files are divided into segments or chunks of data. Multiple chunks of data may be combined to form an object. Compression may be performed. A cryptographic hash function may be performed on an object to derive a hash value. In one particular example, a hash value may be derived using a cryptographic hash function such as Secure Hash Algorithm 1 (SHA-1). Similarly, multiple hash values may be combined to form an object, and the hash function may be performed on that object to derive another hash value. The objects and their associated hash values may be stored in the OBS.

The relationship between the chunks of data (also referred to as chunks) and the hash values may be shown in diagram 700. For example, diagram 700 shows a hierarchy that has four levels, with the chunks of data 705-740 at the lowest level L0 and a single hash value 780 at a highest level L3. The chunks of data 705-740 at the level L0 may be variable sized chunks or fixed sized chunks. For example, each of the chunks of data 705-740 may have a fixed size of 8 KB. Multiple chunks may be grouped together to form an object. For example, an object may contain 128 chunks of 8 KB. The chunk 705 may be associated with an object, and that object may be associated with the hash value 750. Similarly, the chunk 740 may be associated with an object, and that object may be associated with the hash value 766. For some embodiments, when there is an update to a chunk of data, the object associated with that chunk of data is updated, and the hash value associated with that object is updated. Other objects and hash values may remain the same.

A hash value may be 20 bytes in length and may include information that describes its associated object. A hash value may be used as a pointer to locate an object in the OBS. Groups of hash values may be combined together to form an object. For example, at level L2, the hashes 750-756 may be combined into one object, the hashes 760-764 may be combined into another object, and the hash 766 may itself be another object. It may be noted that the example shown in diagram 700 is for illustrative purposes only, and that it may be possible to combine a higher number of hash values together into one object.

The hash values may be stored in a hash table in the OBS along with their associated objects. For some embodiments, the hash table may also be stored in the non-cloud-based storage 620 (shown in FIG. 6). The grouping may also be applied to the hash values at the level L2 to form an object. For example, at the level L3, the hash value 780 may describe an object associated with the level L2. Similarly, at the level L2, the hash value 770 may describe an object associated with the level L1. At the level L0, the chunks 705-740 may represent the content of the disk files associated with a VM. When there are multiple VMs that are backed up by the backup and recovery system 610, each VM may be associated with its own hierarchy of chunks and hash values stored as objects in the OBS. It should be noted that objects stored together in the OBS may, in some embodiments, include chunks from multiple files. A single file at the end will be described by a single hash value which describes all its chunks as described in the hierarchy.

FIG. 8 shows an example of using cloud computing services for recovering VMs, in accordance with some embodiments. One example of the cloud computing services is the EC2 offered by Amazon, Inc., as described above. For some embodiments, a recovery VM service 810 is configured to operate in the cloud environment 801 using cloud computing services 805. For some embodiments, the recovery VM service 810 may itself be a VM configured to execute in the cloud environment 801 using the cloud computing services. The recovery VM service 810 may be configured to recover a full VM directly from an OBS. For some embodiments, the recovery VM service 810 may be initiated by a user via a user interface. For some embodiments, the recovery VM service 810 may be initiated by a software application associated with the backup and recovery system 610.

For some embodiments, the recovery VM service 810 may use the certificate authorization 802 to indicate to the backup and recovery system 610 that the recovery VM service 810 is authorized to access the objects associated with a VM to be recovered. Based on the certificate authorization 802, the backup and recovery system 610 may cause the metadata associated with the VM to be recovered to be sent to the recovery VM service 810. The recovery VM service 810 may then use the metadata 803 to access the objects in the object storage, generate the disks associated with the VM and spawn the VM.

For some embodiments, activation of the recovery VM service 810 may be performed using a user interface. For example, a user may log in to the cloud computing services 805 and request to activate a recovery VM service 810. The user may then log into the recovery VM service, provide the certificate authorization 802 associated with the VM to be recovered. The recovery VM service 810 may receive the metadata associated with the VM from the backup and recovery system 610. For example, the metadata may include a decryption key, identification information about where to retrieve the objects in the object storage, offsets in each object and location of the disks to which the data in the object relates to. This reduces the load on the backup and recovery system 610 because it may not be necessary to download the objects from the object storage.

The recovery VM service 810 may access the configuration file associated with the VM. The recovery VM service 810 may execute a recovery script to access the objects in the OBS, locate the objects and determine the chunks associated with the VM to be recovered. Compressed data may need to be decompressed to eventually recover the disks. The recovered disks are then attached to a VM. The backup and recovery system 610 may be configured to boot the VM using the cloud computing services 805. This may be more efficient than recovering the VM locally because there is less data to be downloaded from the cloud-based storage 615 and less impact on the bandwidth and the processing power of the local system. For some embodiments, operations associated with the backup and recovery system 610 may be configured to execute using the cloud computing services 805. For some embodiments, the recovery VM service 810 may recover the VMs for execution in the cloud environment using the cloud computing services (e.g., EC2). For some embodiments, the recovery VM service 810 may recover the VMs for execution in a primary system that is located in a primary site. For some embodiments, when the primary on-premise system fails (e.g., due to disasters), the recovery VM service 810 may recover the VMs for execution in a secondary system that located at a secondary site.

Figure 9:
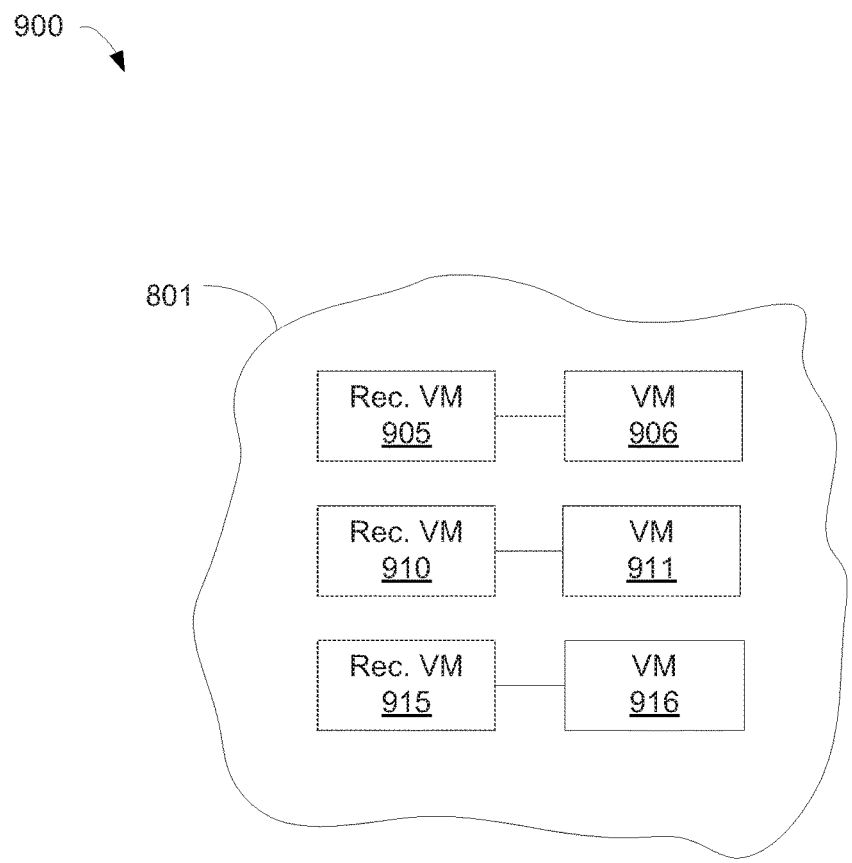
FIG. 9 shows an example of multiple recovery VM services running in parallel, in accordance with some embodiments.

FIG. 9 shows an example of multiple recovery VM service running in parallel, in accordance with some embodiments. For some embodiment, when multiple VMs are to be recovered, multiple instances of the recovery VM service 810 may be activated by the backup and recovery system 610 to operate independently of one another. For some embodiments, some or all of the instances of the recovery VM service 810 may operate in parallel. Diagram 900 shows multiple instances 905, 910, 915 of the recovery VM service 810 executing in parallel to recover the respective VMs 906, 911 and 916. For some embodiments, an instance of the recovery VM service 810 may be deactivated upon completing the recovery of a VM.

Figure 10:
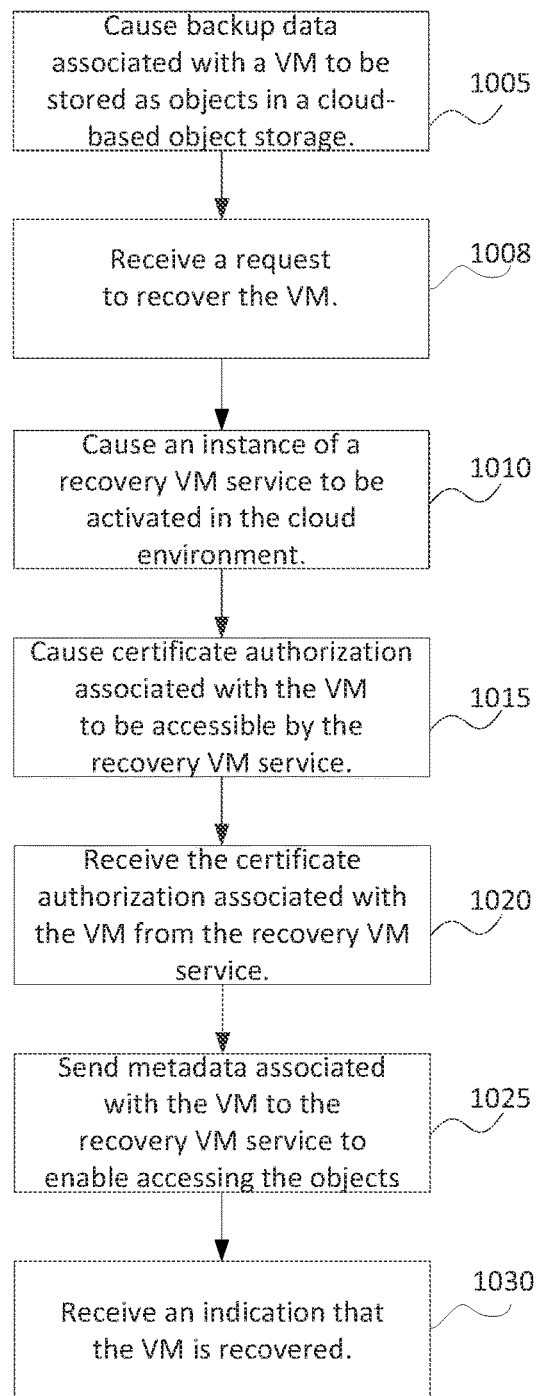
FIG. 10 shows a flowchart of an example of a method for restoring a VM using cloud computing services, in accordance with some embodiments.

FIG. 10 shows a flowchart of an example method for restoring a VM using cloud computing services, in accordance with some embodiments. The method may be performed by the backup and recovery system 610 shown in FIG. 6. At block 1005, backed up data associated with a particular VM may be stored as objects in the OBS of the cloud-based storage 615 (shown in FIG. 8). At block 1008, a request is received by the backup and recovery system 610 to recover the particular VM. At block 1010, an instance of the recovery VM service 810 is activated using the cloud computing services 805. At block 1015, a certificate authorization associated with the particular VM may be provided to the recovery VM service 810. For example, this may be provided by a user using a user interface. The certificate authorization may be installed on recovery VM service and is used to allow the recovery VM service to access to the metadata from the backup and recovery system 610. At block 1020, the certificate authorization associated with the particular VM is received from the recovery VM service 810 by the backup and recovery system 610. Once the certificate authorization is received, the backup and recovery system 610 may send the metadata associated with the particular VM to the recovery VM service 810, as shown in block 1025. The recovery VM service 810 may use the metadata to access the objects associated with the data of the VM to be recovered. The metadata may include information to indicate which objects in the OBS contain the relevant data and keys to decrypt the relevant data. The recovery VM service 810 may operate using the cloud computing services 805, use the objects to create the disks, and then attach the disk to the VM. At block 1030, the backup and recovery system 610 may receive an indication from the recovery VM service 810 that the recovery of the particular VM is completed.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
    storing backed up data associated with a first virtual machine (VM) in a cloud-based storage associated with a cloud computing service;
    causing a first instance of a recovery VM service to be activated, wherein the first instance of the recovery VM service is configured to execute using the cloud computing service;
    causing metadata associated with the first VM to be sent to the first instance of the recovery VM service from a primary site based on receiving a certificate authorization; and
    receiving a notification from the first instance of the recovery VM service that recovery of the first VM is completed, wherein the first VM is configured to execute using the cloud computing service.

2. The method of claim 1, wherein the backed up data associated with the first VM is stored as objects in an object storage associated with the cloud-based storage.

3. The method of claim 2, wherein the first instance of the recovery VM service is configured to recover the first VM using the metadata and the objects in the object storage.

4. The method of claim 3, wherein the first instance of the recovery VM service is configured to create a disk from the objects and attached the disk to the first VM.

5. The method of claim 4, wherein the certificate authorization includes information to indicate that the first instance of the recovery VM service is authorized to access the metadata associated with the first VM, wherein the objects are encrypted, and wherein the metadata includes a decryption key.

6. The method of claim 5, wherein the first instance of the recovery VM service is configured to terminate based on completion of the recovery of the first VM.

7. The method of claim 6, further comprising causing the metadata associated with the first VM to be sent to the first instance of the recovery VM service from a secondary site based on the primary site not being accessible.

8. The method of claim 7, further comprising:
    storing backed up data associated with a second VM in the cloud-based storage associated with the cloud computing service; and
    causing a second instance of the recovery VM service to be activated using the cloud computing service in response to receiving a request to recover the second VM, the second instance of the recovery VM service configured to execute independently of the first instance of the recovery VM service.

9. A computer program product comprising computer-readable program code to be executed by one or more processors when retrieved from a non-transitory computer-readable medium, the program code including instructions to:
  store backed up data associated with a first virtual machine (VM) in a cloud-based storage associated with a cloud computing service;
  cause a first instance of a recovery VM service to be activated, wherein the first instance of the recovery VM service is configured to execute using the cloud computing service;
  cause metadata associated with the first VM to be sent to the first instance of the recovery VM service from a primary site based on receiving a certificate authorization; and
  receive a notification from the first instance of the recovery VM service that recovery of the first VM is completed, wherein the first VM is configured to execute using the cloud computing service.

10. The computer program product of claim 9, wherein the backed up data associated with the first VM is stored as objects in an object storage associated with the cloud-based storage.

11. The computer program product of claim 10, wherein the first instance of the recovery VM service is configured to recover the first VM using the metadata and the objects in the object storage.

12. The computer program product of claim 11, wherein the first instance of the recovery VM service is configured to create a disk from the objects and attached the disk to the first VM.

13. The computer program product of claim 12, wherein the certificate authorization includes information to indicate that the first instance of the recovery VM service is authorized to access the metadata associated with the first VM, wherein the objects are encrypted, and wherein the metadata includes a decryption key.

14. The computer program product of claim 13, wherein the first instance of the recovery VM service is configured to terminate based on completion of the recovery of the first VM.

15. The computer program product of claim 14, further comprising causing the metadata associated with the first VM to be sent to the first instance of the recovery VM service from a secondary site based on the primary site not being accessible.

16. The computer program product of claim 15, further comprising:
  storing backed up data associated with a second VM in the cloud-based storage associated with the cloud computing service; and
  causing a second instance of the recovery VM service to be activated using the cloud computing service in response to receiving a request to recover the second VM, the second instance of the recovery VM service configured to execute independently of the first instance of the recovery VM service.

17. A system comprising:
  a processor-based application executed on a computer system and configured to:
  store backed up data associated with a first virtual machine (VM) in a cloud-based storage associated with a cloud computing service;
  cause a first instance of a recovery VM service to be activated, wherein the first instance of the recovery VM service is configured to execute using the cloud computing service;
  cause metadata associated with the first VM to be sent to the first instance of the recovery VM service from a primary site based on receiving a certificate authorization; and
  receive a notification from the first instance of the recovery VM service that recovery of the first VM is completed, wherein the first VM is configured to execute using the cloud computing service.

18. The system of claim 17, wherein the backed up data associated with the first VM is stored as objects in an object storage associated with the cloud-based storage.

19. The system of claim 18, wherein the first instance of the recovery VM service is configured to recover the first VM using the metadata and the objects in the object storage, and wherein the first instance of the recovery VM service is configured to create a disk from the objects and attached the disk to the first VM.

20. The system of claim 19, wherein the certificate authorization includes information to indicate that the first instance of the recovery VM service is authorized to access the metadata associated with the first VM, wherein the objects are encrypted, and wherein the metadata includes a decryption key.

* * * * *